Feb. 7, 1967   J. J. GRAY   3,302,927
PORTABLE AUTOMOBILE LIFT HAVING TRANSVERSELY ADJUSTABLE
BUMPER-ENGAGING MEANS AND SEPARATE FRAME-ENGAGING MEANS
Filed May 14, 1965

INVENTOR.
James J. Gray
BY
Scofield, Kohjes, Scofield & Lowe
ATTORNEYS.

United States Patent Office 3,302,927
Patented Feb. 7, 1967

3,302,927
PORTABLE AUTOMOBILE LIFT HAVING TRANSVERSELY ADJUSTABLE BUMPER-ENGAGING MEANS AND SEPARATE FRAME-ENGAGING MEANS
James J. Gray, St. Joseph, Mo., assignor to Gray Manufacturing Company, Inc., St. Joseph, Mo., a corporation of Missouri
Filed May 14, 1965, Ser. No. 455,875
6 Claims. (Cl. 254—2)

This invention relates to vehicle lifting devices employed by garages, service stations and manufacturing concerns which are both portable and easily modified to accommodate the many and varied types of vehicles, both foreign and domestic, whenever a need for inspection or servicing arises.

It has become increasingly important to the garage and service station mechanics to spend as little time as possible getting ready to perform chargeable services. There are many quick-service automobile repair jobs which do not require the use of a vehicle hoist of the permanent pneumatic type that completely lifts the vehicle from the ground on a vertically movable frame. Such jobs or repairs as replacing mufflers, tailpipes, tires, oil filter replacements, shock absorbers and brake band replacements require only that one end of the vehicle be raised. Many garage or service stations usually have but a single permanent pneumatic lift or hoist, so portable lifts are useful and economically essential to take care of the minor repairs that can be performed at any convenient location without occupying the permanent hoist. Thus an efficiently run shop will normally include one or more portable lifts, whereby either end of the vehicle may be lifted sufficiently to make the repairs required.

Therefore, an object of the invention is to provide a portable lift mechanism having means thereon adapted to permit lifting of an automobile or truck by either the bumper or the frame.

Another object of the invention is to provide a lift with improved saddle assemblies carried by telescoping arms adjustable within a cross frame member of the lift to accommodate different makes and models of automobiles with the saddle members, themselves adjustable and alterable to add versatility to their operations.

Another object of the invention is to minimize obsolescence of the lift by providing simple means for installing low cost adapter units designed to solve future lifting problems and readily interchangeable with those shown.

A further object of the invention is to provide unitary saddle assemblies having resilient bumper and rigid frame engaging members with the supports for said assemblies adjustable both forwardly, rearwardly, inwardly, outwardly and vertically with respect to the lift, independent of whatever adjustment is made with the telescoping arms.

A still further object of the invention is to provide novel saddle assemblies, the saddles having alternatively bumper engaging or frame engaging members, the frame engaging members besides being adjustable with the resilient bumper engaging members, have additionally a plurality of vertical adjustments to receive various types of automotive frame structures.

Other and further objects of the invention, together with the features of novelty appurtenant thereto, will appear in the course of the following description.

In the accompanying drawings, which form a part of the specification, and are to be read in conjunction therewith, and in which like reference numerals indicate like parts in the various views.

Figure 1:
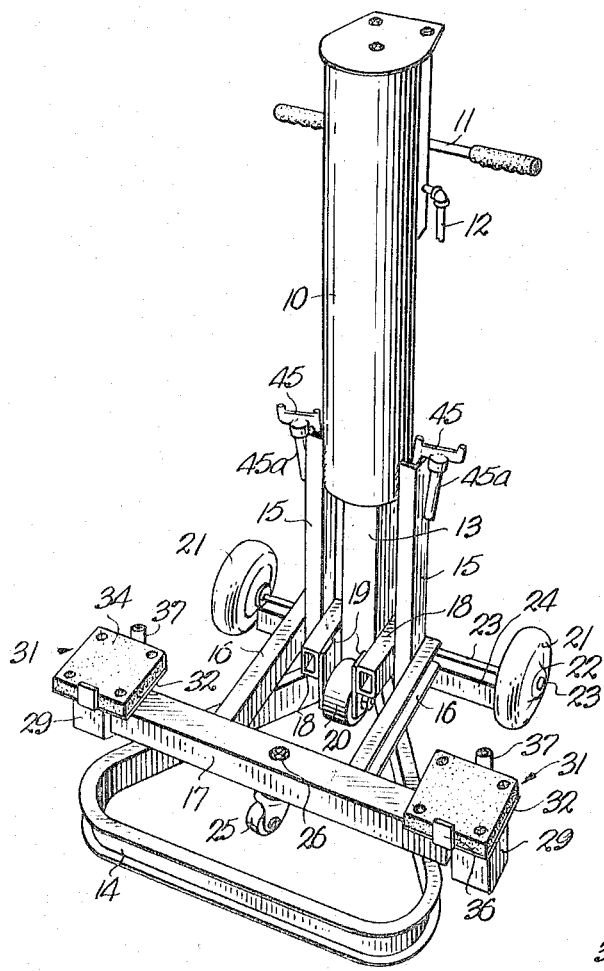
FIG. 1 is a front perspective view of a portable lift embodying the inventive structure employing the adjustable saddle assemblies with the frame engaging members dismounted.

Referring now to the drawings, reference numeral 10 depicts a movable pneumatic power cylinder of any suitable design to which is attached steering bar 11. Air to operate the cylinder is supplied through a detachable air connection 12, controlled by a manually operated valve from the rear of the cylinder, not shown. Power cylinder 10 is movable relative to an upright rectangular tubular steel member 13 hereinafter referred to as the center column. This center column is rigidly supported upon a rugged steel triangular base 14 that provides maximum stability during the lifting operation. On opposite sides of power cylinder 10 are welded rectangular tubular steel arms 15 which extend downwardly parallel to center column 13. These arms terminate above base 14 and have affixed thereto at their lower ends a second pair of horizontal members 16, extending forward parallel to the plane of the triangular base 14. To the forward ends of members 16 is attached a lift or cross frame 17. Welded to the inside surfaces of arms 15 is a third pair of parallel arms 18 also of tubular construction. Depending from arms 18 is a pair of flanges 19 carrying thrust wheel 20, which contacts and rolls smoothly along the front surface of center column 13. Center column 13 and base 14 are supported by a pair of semi-pneumatic tires 21 mounted on wheels 22, which are rotatably mounted on axle 23 carried by brackets which extend upwardly at the ends of a rear stabilizer bar 24. This stabilizer bar is rigidly attached by welding to the rear end of the triangular base 14.

Wheels 22 cooperate with tricycle wheel or caster 25 attached at bolt 26 to cross frame 17 to provide a portable unit, easily rolled into position to life a vehicle. With the lift in place beneath the front or rear end of the vehicle the air valve which operates cylinder 10 is opened, causing the cylinder and lifting frame 15, 16 and 17 to move upwardly along column 13, at which time tricycle wheel 25 is lifted and base 14 lowered to rest on the floor or pavement. During this initial stage of the lifting operation stabilizer bar 24 remains supported above the floor on the compressible tires 21, but as the weight of the vehicle is assumed by the lift the tires compress, lowering the stabilizer to the floor where it seats and becomes a part of the base, preventing overloading of the tires.

Figure 2:
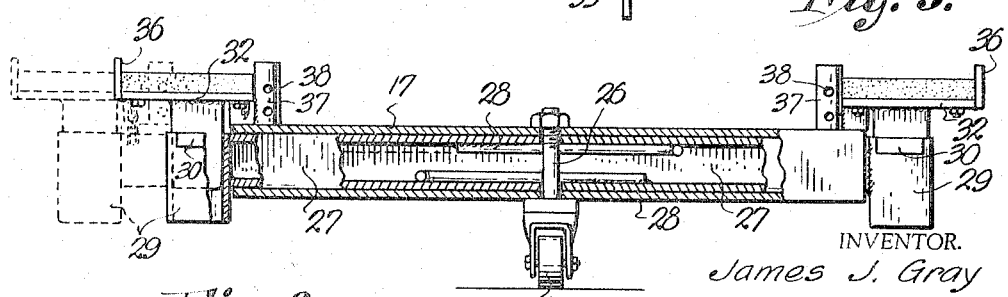
FIG. 2 is a rear view of the adjustable telescoping cross frame with a portion shown in cross section, one arm shown in dashed lines when in an extended position.

Cross frame 17 is constructed of a rectangular tube and extends transversely to horizontal support members 16. The cross frame is dimensioned to receive at each end thereof a slightly smaller rectangular telescoping tubular extension arm 27. Extension arms 27 are slidable within cross frame 17 and each has a looped rod 28 welded to the arms' interior, alternatively to the top and bottom shown in FIG. 2. Each rod has the loop at its inner end to engage center bolt 26 when arms 27 are moved outwardly a prescribed distance as indicated by the dashed lines in FIG. 2. The looped rods are provided as a precautionary measure to insure that neither extension arm will become disengaged from cross frame 17.

Figure 3:
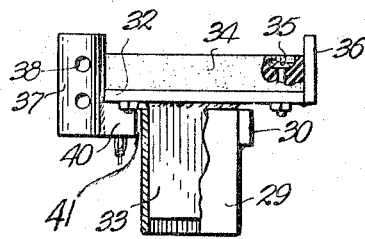
FIG. 3 is a right end view of the cross frame member shown in FIG. 1 with its saddle assembly rotated 180°.
Figure 4:
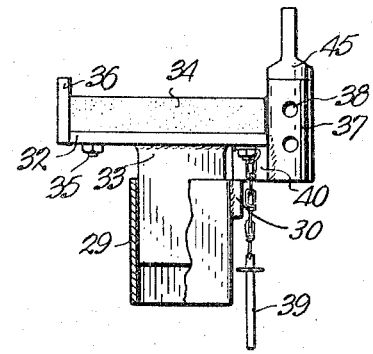
FIG. 4 is a right end view of the cross frame member as shown in FIG. 3 with the saddle assembly positioned as shown in FIG. 1 and one of the frame engaging members in place.
Figure 5:
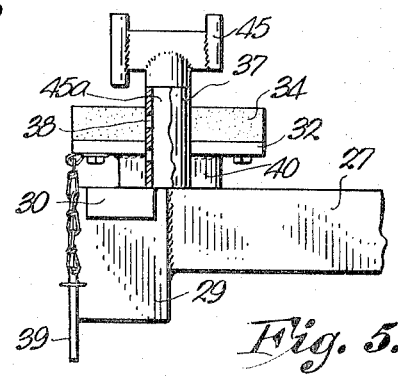
FIG. 5 is a fragmentary rear view of the right end of the cross frame and saddle assembly shown in FIG. 1 with the socket for the frame engaging member partially broken away.

A tubular holder 29, square shaped in cross section, is welded onto the outer end of both extension arms 27. Each holder is positioned with its top open end flush against the top side of each extension arm. Each holder has a lug 30 shown in FIGS. 2, 3, 4 and 5 welded to its rear side. This lug may vary in size but is usually about ⅜ inch thick and approximately 2 inches long and serves as a height increasing means hereinafter described. Holders 29 are constructed to receive saddle assemblies generally shown at 31 in FIGS. 1 and 2 and detailed in FIGS. 3, 4 and 5. Each saddle assembly comprises a metal plate 32 mounted upon a rectangular tubular supporting member 33. Each saddle supporting member 33 is of slightly smaller dimension than the inside dimension of its holder 29 so it may slidably engage its holding member as shown in FIGS. 3, 4 and 5. It should be noted that since supporting member 33 is square in cross section, its saddle assembly may be located at any one of four different positions.

A resilient cushion 34 is secured to each metal plate 32 by fastening means shown as bolts 35. The contacting surfaces of the bumper and these resilient pads or cushions cause the pads to conform with the bumper contour, distributing the load uniformly across the cushions and preventing slippage relative thereto. On one edge of metallic plate 32 is welded a safety stop 36. While cushion 34 will contact the bumper of the vehicle during a bumper lift and has sufficient resiliency to prevent any marring or slippage, stop 36 provides a further safety feature. Located directly opposite stop 36 is a frame yoke receiving socket 37 also extending above cushion 34. Socket 37 has vertically aligned holes 38 to receive adjusting pin 39. The socket 37 is welded to a second steel lug 40 beneath plate 32 shown in FIGS. 3 and 4. The inside of lug 40 is spaced from supporting member 33 to define a space numbered 41 and this space is of sufficient width so one side of holder 29 may fit therebetween as shown in FIG. 3. Since the outer end of each extension arm 27 is welded to one side of a holder 29 and lug 30 to an adjacent side of the holder, the supporting member 33 will have two positions within the holder in which the vertical height of the saddle assembly will be increased by the depth of lug 40. One position will be when it rests on top of lug 30 as shown in FIGS. 4 and 5, the other when it rests on either the top surface of arm 27 or on cross frame 17 when the arm is extended. In the other two positions the vertical height of the saddle assembly will be lower as where one side of holder 29 is allowed to slide between lug 40 and the side of supporting member 33 in space 41 thereby seating metal plate 32 on arms 27, as shown in FIGS. 3 and 5.

Once it is decided that it is necessary to lift a vehicle, the operator is faced with the immediate problem of how best to perform this lifting operation to expose an optimum work area. Among the many problems arising in making this determination are; whether a car's bumper is strong enough to take a bumper lift; whether a bumper lift may be accomplished without marring, scratching or otherwise abusing either the bumper or a gravel guard sometimes affixed thereto; and the safety and work area considerations that are involved with the hard-to-get-at portions of the underneath side of a vehicle. There are times when lifting a vehicle by its bumper is not the most desirable method and instead to apply the lift to some portion of the frame. Besides, the under parts of vehicles are not located in the same places, thus making it necessary that the lifting devices be flexible enough to allow the frame engaging members to be adjusted to engage the frame at proper points or locations.

The frame lifting yokes 45 have cylindrical stems 45a which are dimensioned to allow them to be inserted and swiveled within sockets 37. The yokes at their upper ends have frame engaging cradles. The ears at the extremities of the cradles are adaptable to be inserted in perforation or holes often provided in the frame or bumpers of vehicles especially for the purpose.

Cylindrical yoke stems 45a according to the embodiment shown are of solid construction so pins 39 may be inserted through aligned holes 38 in the sockets to afford the frame lifting yokes additional vertical positions. Since stems 45a are of circular cross section, they may be swiveled to facilitate positioning of the yokes relative to frames of different vehicles and raised or lowered by adjustment of pins. When combined with the lateral and vertical adjustability of saddle assemblies 31, it is seen that my lifting device has a great deal of versatility in accommodating the many and varied models and types of vehicles.

In operation, the entire lift is moved to and positioned in close proximity to the vehicle ready for work or inspection. If it is determined that a bumper lift will suffice, then saddle assemblies 31 with their many adjustable features are moved into contact with the bumper on the end to be raised and the lift operated as explained until the vehicle is at an appropriate height. When the strength of the bumper is in doubt, the device may be converted to a frame lift by merely inserting stems 45a of yokes 45 into the sockets 37 of the saddle assemblies.

The power cylinder 10 is provided with the usual safety locks relative the center column 13 to insure the entire lift against failure of the pneumatic system.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a pneumatic lift having;
   a base and a vertical column affixed thereto, a power cylinder slidably mounted on said column, and a cross frame rigidly affixed to and movable with said power cylinder,
   the improvement comprising;
   an extendible cross frame,
   bumper engaging saddle assemblies mounted on said cross frame, and
   separate removable frame engaging yokes swivelly mounted on said saddle assemblies.

2. The improvement of claim 1 wherein each one of said bumper engaging saddle assemblies includes a metal plate supported by a tubular member, each tubular member slidably mounted in the cross frame,
   a lug welded against one edge of each of said metal plates,
   a second lug welded to the end portions of the cross frame, said first and second lugs cooperating to increase the vertical height of said saddle assemblies relative to said cross frame.

3. The improvement of claim 2 including a means for receiving a frame engaging yoke, said means having a cylindrical socket rigidly attached to said first lug and said edge of the metal plate of a saddle assembly,
   said socket defining a series of vertically spaced holes,
   means insertable through said holes for raising and lowering the height of said yoke relative to said flat metal plate of the saddle assembly.

4. A portable pneumatic lift having a base, a vertical column affixed thereto and ground wheels carrying said base and column assembly, a power cylinder slidably mounted on said column and a lift frame including a cross frame member rigidly affixed to and movable with said power cylinder, the improvement comprising a tricycle wheel positioned centrally beneath the cross frame member cooperating with the ground wheels to aid in the portability of the lift and permitting the base to be lowered to the ground or floor level upon raising of the lift frame.

5. A portable pneumatic lift having a base, a vertical column affixed thereto and ground wheels with compressible tires carrying said base and column assembly, a power cylinder slidably mounted on said column and a lift frame including a cross frame member rigidly affixed to and movable with said power cylinder, the improvement comprising a transverse stabilizer bar affixed to the vertical column and base assembly and serving as a mounting for the ground wheels, said ground wheels adapted to support the stabilizer bar above ground level until the weight of the vehicle being lifted compresses the ground wheels sufficiently to level the stabilizer bar with the base, whereby said bar provides a stop preventing overloading of the ground wheels and tires.

6. In a portable pneumatic lift having a base, a vertical column affixed thereto and ground wheels with compressible tires carrying said base and column assembly, a power cylinder slidably mounted on said column and a lift frame including a cross frame member rigidly affixed to and movable with said power cylinder, the improvement comprising a tricycle wheel positioned centrally beneath the cross frame member cooperating with the ground wheels to aid in the portability of the lift and permitting the base to lower to ground or floor level upon raising of the lift frame, a transverse stabilizer bar affixed to the vertical column and base assembly and serving as a mounting for the ground wheels, said ground wheels adapted to support the stabilizer bar above the ground level until the weight of the vehicle being lifted compresses the tires sufficiently to level the stabilizer bar with the base, whereby said bar provides a stop preventing overloading of the ground wheels and tires.

References Cited by the Examiner
UNITED STATES PATENTS

| | | | |
|---|---|---|---|
| 2,867,409 | 1/1959 | Southerwick | 254—2 |
| 2,974,490 | 3/1961 | Hott | 254—2 X |
| 3,044,747 | 7/1962 | Nolden | 254—2 |
| 3,080,147 | 3/1963 | Greenhaw | 254—2 |
| 3,091,431 | 5/1963 | Arnes et al. | 254—2 |
| 3,165,295 | 1/1965 | Nolden | 254—2 |
| 3,245,659 | 4/1966 | Nolden | 254—134 |

FOREIGN PATENTS 559,029   6/1923   France.

WILLIAM FELDMAN, *Primary Examiner.*

MILTON S. MEHR, *Examiner.*